(12) United States Patent
Boland

(10) Patent No.: US 12,415,480 B2
(45) Date of Patent: *Sep. 16, 2025

(54) WINDSCREEN WIPER DEVICE OF THE FLAT BLADE TYPE

(71) Applicant: TRICO BELGIUM S.A., Aubange (BE)

(72) Inventor: Xavier Boland, Arlon (BE)

(73) Assignee: TRICO BELGIUM S.A., Aubange (BE)

( * ) Notice: Subject to any disclaimer, the term of this patent is extended or adjusted under 35 U.S.C. 154(b) by 44 days.

This patent is subject to a terminal disclaimer.

(21) Appl. No.: 17/921,011

(22) PCT Filed: Apr. 24, 2020

(86) PCT No.: PCT/EP2020/061539
§ 371 (c)(1),
(2) Date: Oct. 24, 2022

(87) PCT Pub. No.: WO2021/213684
PCT Pub. Date: Oct. 28, 2021

(65) Prior Publication Data
US 2023/0219530 A1    Jul. 13, 2023

(51) Int. Cl.
*B60S 1/40* (2006.01)
*B60S 1/38* (2006.01)
*B60S 1/34* (2006.01)

(52) U.S. Cl.
CPC ........... *B60S 1/4087* (2013.01); *B60S 1/3848* (2013.01); *B60S 1/3425* (2013.01); *B60S 1/4083* (2013.01)

(58) Field of Classification Search
CPC ........ B60S 1/40; B60S 1/4087; B60S 1/4083; B60S 1/3425
See application file for complete search history.

(56) References Cited

U.S. PATENT DOCUMENTS 3,135,983 A * 6/1964 William ................. B60S 1/4087
15/250.32
3,405,419 A * 10/1968 Charlton ............... B60S 1/4087
15/250.32

(Continued)

FOREIGN PATENT DOCUMENTS

DE    102016204243    9/2017
EP    0566443        10/1993

(Continued)

OTHER PUBLICATIONS

International Search Report and Written Opinion for PCT/EP2020/061539 dated Dec. 22, 2020.

(Continued)

*Primary Examiner* — Michael D Jennings
(74) *Attorney, Agent, or Firm* — DAY PITNEY LLP; George N. Chaclas; Anthony A. Kassas

(57) ABSTRACT

A windscreen wiper device of the flat blade type comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device (1) for a rod-like extension (2) of an oscillating arm, wherein said rod-like extension (2) can be pivotally connected to said connecting device (1) about a pivot axis near a free end thereof, wherein said connecting device (1) comprises a channel (15) arranged to receive said rod-like extension (2), wherein the connecting device (1) comprises a first and a second retention mechanism for retaining said rod-like extension (2) on said connecting device (1), wherein said first and second retaining mechanisms are arranged to engage in a first, respectively second recess provided on at least one longitudinal exterior side (18a, 18b)

(Continued)

of said rod-like extension (2), wherein said channel (15) at least at the entrance and at the opposite end of said entrance has the same width for receiving a rod-like extension (2) having a substantially constant width along the distal end thereof.

18 Claims, 6 Drawing Sheets

(56) References Cited

U.S. PATENT DOCUMENTS

| | | | | |
|---|---|---|---|---|
| 6,272,718 | B1 * | 8/2001 | Van De Bruinhorst | ..................... B60S 1/3447 15/250.352 |
| 8,782,845 | B2 * | 7/2014 | Bousset | ................... B60S 1/386 15/250.31 |
| 2009/0007364 | A1 * | 1/2009 | Jarasson | ............... B60S 1/4006 15/250.32 |
| 2015/0375716 | A1 * | 12/2015 | An | ........................ B60S 1/4003 15/250.32 |
| 2019/0135238 | A1 * | 5/2019 | Seiller | ....................... B60S 1/40 |
| 2021/0309184 | A1 * | 10/2021 | Taillard | ................. B60S 1/3856 |
| 2022/0281417 | A1 * | 9/2022 | Boland | .................. B60S 1/4087 |

FOREIGN PATENT DOCUMENTS

| | | | | |
|---|---|---|---|---|
| WO | WO-2005108176 A1 * | 11/2005 | .............. B60S 1/381 |
| WO | 2016119852 | 8/2016 | |
| WO | WO-2017140343 A1 * | 8/2017 | ............ B60S 1/3425 |
| WO | WO-2017190762 A1 * | 11/2017 | ............ B60S 1/4087 |
| WO | 2020020431 | 1/2020 | |
| WO | WO-2020020431 A1 * | 1/2020 | ............ B60S 1/3856 |
| WO | WO-2020043264 A1 * | 3/2020 | ............ B60S 1/3429 |

OTHER PUBLICATIONS

Notification Concerning Transmittal of International Preliminary Report on Patentability for PCT/EP2020/061539 dated Nov. 3, 2022.

* cited by examiner

WINDSCREEN WIPER DEVICE OF THE FLAT BLADE TYPE

CROSS-REFERENCE TO RELATED APPLICATIONS

This application is a U.S. national stage entry of International Application Number PCT/EP2020/061539 filed on Apr. 24, 2020, which is incorporated by reference herein in its entirety.

BACKGROUND

A windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature.

SUMMARY

The present invention relates to a windscreen wiper device of the flat blade type comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for a rod-like extension of an oscillating arm, wherein a rod-like extension can be pivotally connected to said connecting device about a pivot axis near one end thereof. Said longitudinal strip is also called a "flexor", while said connecting device is also indicated as a "connector".

Preferably, said wiper blade comprises a spoiler at a side thereof facing away from the windscreen to be wiped. The spoiler is also called an "air deflector" and is preferably made in one piece with said wiper blade through extrusion. Said longitudinal groove is preferably a central longitudinal groove accommodating said longitudinal strip. Said connecting device is preferably fixedly connected to the longitudinal strip(s) particularly through a welding, brazing ("soldering"), gluing or clamping operation or with the help of a pin inserted through said connecting device and said longitudinal strip(s). In the alternative or in addition thereto, said connecting device is clamped onto the flexible material of the wiper blade, particularly in case the latter is equipped with a central longitudinal groove for the carrier element.

In use, said oscillating arm is connected to a mounting head mounted on a drive shaft, wherein said oscillating arm at one end thereof is pivotally connected to the mounting head by means of a pivot pin and at another end thereof is connected to said wiper blade placed in abutment with said windscreen to be wiped. In use, the shaft rotates alternately in a clockwise and in a counter-clockwise sense carrying the mounting head into rotation also, which in turn draws the oscillating arm into rotation and by means of said connecting device moves the wiper blade. Said oscillating arm can thus oscillate to-and-from between a first and second reversal positions.

The present invention also relates to a connecting device, as well as an oscillating arm with a rod-like extension arranged for use in such a windscreen wiper device.

It is noted that the present invention is not restricted to automobiles, but also refers to rail coaches and other (fast) vehicles.

The object of the invention is to provide an improved and/or more reliable windscreen wiper device and oscillating arm for a windscreen wiper device.

In order to accomplish that objective, a windscreen wiper device according to claim 1 is provided. Specifically, a windscreen wiper device of the flat blade type is provided comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for a rod-like extension of an oscillating arm, wherein said rod-like extension can be pivotally connected to said connecting device about a pivot axis near a free end thereof, wherein said connecting device comprises a channel arranged to receive said rod-like extension, wherein the connecting device comprises a first and a second retention mechanism for retaining said rod-like extension on said connecting device, wherein said first and second retaining mechanisms are arranged to engage in a first, respectively second recess provided on at least one longitudinal exterior side of said rod-like extension, wherein said channel at least at the entrance and at the opposite end of said entrance has the same width for receiving a rod-like extension having a substantially constant width along the distal end thereof.

By providing a rod-like extension having a substantially constant width along the distal end, stresses are reduced and an improved corrosion resistance is obtained compared to for instance extension having a decreased width or a varying width at the end thereof. Preferably, at least along the length of the rod-like extension to be received in the channel, the width of the rod-like extension is substantially constant.

The channel is then arranged to receive said extension and is thereto provided with a width corresponding to the width of the extension at at least the entrance and the opposite end thereof. The rod-like extension can then be efficiently guided and retained in the channel, thereby limiting any play. The corresponding width at the entrance further assists in efficiently introducing the extension in said channel upon mounting.

Preferably not only the width of the channel corresponds to rod-like extension, but also the height and shape. This improves the retention. Preferably, the channel, at least at the entrance and the opposite end thereof, comprises a cross-sectional shape matching the cross-sectional shape of the rod-like extension.

In view of the transfer of forces between the rod-like extension and the connecting device, it is preferred that the sections of corresponding widths, or cross-sectional shape as mentioned above, in the channel are located at the entrance of the channel and the opposite end of the channel. In the alternative, the sections of corresponding widths, or cross-sectional shape as mentioned above, in the channel are arranged at a mutual distance, seen along the length of the rod-like extension. In the alternative one such section is provided.

According to a further preferred embodiment, said channel comprises a first chamber near the entrance of said channel and a second chamber at a distance from the first chamber near the opposite end of the channel, wherein said chambers have the same width. The two chambers preferably comprise a cross-sectional shape matching the cross-sectional shape of the rod-like extension. Providing the chambers, or sections as mentioned above, at a distance, provides space in the connecting device for other constructional parts such as a pivot mechanism and/or retaining mechanisms, while maintaining an effective retention of the rod-like extension. At least one of these constructional parts is preferably arranged between the two chambers. The chamber at the entrance preferably has a length suitable for guiding said rod-like extension through the intermediate part between the chambers.

As an alternative, said channel has a substantially constant width, or matching cross-sectional shape as mentioned above, from the entrance to the opposite end.

Preferably, the channel is shaped complementary to the shape of the rod-like extension.

According to a further preferred embodiment, said channel, or a section or chamber thereof, has a closed circumference along at least part if its length. This improves the retention of the extension in said channel. Preferably, at least the chamber at the entrance has a closed circumference along at least a part of its length to provide the guiding function of the rod-like extension, i.e. to prevent any movement other than a movement of the rod-like extension along its longitudinal direction.

Movement in the longitudinal direction of the extension in the connected state of the rod-like extension is further efficiently blocked when, according to a further preferred embodiment, said channel has a closed end for receiving the distal surface of the rod-like extension. More preferably, the chamber at the opposite end is provided with an end wall for receiving said distance end of the rod-like extension.

As mentioned, the connecting device comprises a channel arranged to receive said rod-like extension, wherein the connecting device comprises a first and a second retention mechanism for retaining said rod-like extension on said connecting device. The first and second retaining mechanisms may be arranged to engage in a first, respectively second recess provided on at least one longitudinal exterior side of said rod-like extension. The first and second retaining mechanisms may each be provided with protrusions to be received in the respective recesses. If one of the retaining mechanisms should fail, the other retaining mechanism then retains the rod-like extension on the connecting device.

The connecting device is preferably provided with two retention mechanisms which preferably operate separately from each other. The retention mechanisms are arranged to cooperate with respective recesses provided in the rod-like extension. The rigidity of the rod-like extension is improved, as compared to using for instance through holes as recesses, when at least one of the recesses, preferably both recesses are provided on at least one longitudinal exterior side, or lateral side, of said rod-like extension. It is then preferred that said first and second recesses have an open circumference. Preferably, said recesses are provided in the rod-like extension by a cutting operation. Preferably, both recesses have the same configuration, i.e. width and depth. The retention mechanisms are then arranged to engage these recesses having open circumferences.

According to a further preferred embodiment, said recesses are arranged at different, preferably opposite, sides the rod-like extension. This ensures proper insertion of the rod-like extension in said channel, as each retention mechanism, for instance a protrusion thereof, operates on a dedicated, opposite side of the rod. Accidental engagement of a first retention mechanism in a second recess, not intended for the first retention mechanism, is then prevented. Preferably, said recesses are arranged at opposite longitudinal exterior or lateral sides of the rod-like extension.

According to a further preferred embodiment, the recesses are arranged at different, preferably opposite, sides of the rod-like extension at the same location along the length of the rod-like extension. The recesses are hereby arranged at substantially the same longitudinal location on the rod-like extension at preferably opposite sides thereof. This results in a compact configuration, such that the remainder of the length of the rod-like extension can remain intact. This improves the retention and distribution of stresses, in particular when the channel has a corresponding width or cross-sectional shape as mentioned above. Providing the recesses at the same longitudinal location, preferably by a cutting operation as mentioned above, further improves the manufacturing process of the rod-like extension.

It is noted that, according to an alternative embodiment, the features of the recesses being provided at different sides of the rod-like extension, preferably at opposite sides of the rod-like extension at the same location along the length of the rod-like extension, may also be applied in a windscreen wiper device having a channel with varying width. The rod-like extension may then have a varying width, for instance similar to the configuration as disclosed in international patent publication WO 2020/020431 A1, which is hereby incorporated by reference.

Preferably, said channel has a length and a width, wherein a plane extending in a direction of the width of said channel and a plane extending through said longitudinal strip along a width thereof at the location of the connecting device enclose an angle $\alpha$, wherein preferably $15°<\alpha<60°$, more preferably $\alpha$ is $40°$ or at least around $40°$. In other words, in a transverse or cross-section of the windscreen wiper device, a centre line of the cross-sectional plane of said channel encloses the angle $\alpha$ with a symmetry axis of said longitudinal groove. Because of the angle $\alpha$ less pressure by the oscillating arm on the wiper blade is necessary to maintain high velocity wiping performances.

Said oscillating arm is preferably equipped with said rod-like extension preferably having a rectangular cross-section, wherein said extension is to be inserted in the channel of the connecting device, and wherein said extension has a twisted orientation relative to the oscillating arm preferably having a U-shaped cross-section. Such a twisted arm extension has proven to considerably improve an air flow, to considerably reduce a height of the windscreen wiper device, whereas its design is attractive from a commercial perspective. Said channel preferably having a rectangular cross-section as well, has a twisted orientation corresponding to the twisted orientation of the arm extension in order to accommodate said arm extension during use. In other words, a bottom of said channel does not extend parallel to a windscreen to be wiped (when the oscillating arm in one of said reversal positions is in a central region of the windscreen to be wiped and disregarding any small curvature thereof in that region), but said bottom and said windscreen to be wiped enclose said angle $\alpha$ in that region.

It is noted that the present invention is not restricted to the use of only one longitudinal strip forming the elastic carrier element that is particularly located in a central longitudinal groove of the wiper blade. Instead, said carrier element may also comprise two longitudinal strips, wherein said strips are disposed in opposite longitudinal grooves of the wiper blade. Said groove(s) may be closed at one outer end. As a further alternative, the wiper blade may be any type of wiper blade, for instance a traditional wiper device comprising a plurality of yokes pivotally connected to each other.

According to a further preferred embodiment, said first and second retaining mechanisms comprise respective protrusions to engage the first and second recesses provided in the rod-like extension. Preferably, at least one of said protrusions, preferably both protrusions, and the rod-like extension are provided movable with respect to each other to move a protrusions between a locked position for retaining the wiper blade, specifically the connecting device thereof, on the rod-like extension and a unlocked position wherein the protrusion disengages a recess for releasing said wiper blade from said rod-like extension. Preferably, both retaining mechanism are movable between said positions independently of each other, improving the failsafe retention of the wiper blade.

According a further preferred embodiment, the connecting device comprises a protrusion arranged to engage into the first recess provided on a longitudinal exterior side of said rod-like extension. Said first protrusion may be sidewardly and inwardly extending. Preferably, said connecting device further comprises a resilient tongue arranged to engage into the second recess provided on a longitudinal exterior side of said rod-like extension. The resilient tongue, which may comprise a protrusion for engaging said second recess, may be movable between a locked and unlocked position by hinging said resilient tongue relative to said connecting device. Preferably, said resilient tongue is hingeable along a hinge axis between an inward position retaining said wiper blade onto said rod-like extension and an outward position releasing said wiper blade from said rod-like extension.

Particularly, said channel has a closed circumference. More in particular, said channel is formed by a blind hole having a closed circumference. As mentioned above, said blind hole is then preferably shaped in accordance with the shape of the rod-like extension. The resilient tongue cooperating with the second recess on the one hand and the protrusion cooperating with the first recess on the other hand form first and second retention mechanisms, respectively, for retaining the wiper blade onto the oscillating arm. Said first and second retention mechanisms can be used independently from one another, i.e. the first retention mechanism can be used without the second retention mechanism and the second retention mechanism can be used without the first retention mechanism.

In case the plane extending in the direction of the width of the channel extends under angle as mentioned above, i.e. when the rod-like extension has a twisted orientation relative to the oscillating arm and is under an angle with respect to the windscreen to be wiped, said rod-like extension has an upper longitudinal exterior side and a lower longitudinal exterior side. The lower side extends lower than the upper side. It is then preferred if said protrusion is arranged to engage said recess in the upper longitudinal exterior side and wherein the resilient tongue is arranged to engage the recess in the lower longitudinal exterior side. An improved retention is thus obtained while maintaining a compact connecting device.

Preferably, said resilient tongue is hingeable from said inward position into said outward position by a push button, wherein said push button forms a part of an outer wall of said connecting device. Particularly, said push button is located near a free end of said connecting device facing towards said rod-like extension. More preferably, said hinge axis extends substantially perpendicular to the longitudinal axis of the rod-like extension.

According to a further preferred embodiment, said protrusion is dimensioned such that
in a working position of said wiper blade pivoted relative to said rod-like extension, said protrusion engages into said first recess thus retaining said wiper blade onto said rod-like extension;

in a service position of said wiper blade pivoted relative to said rod-like extension, said protrusion disengages from said first recess thus releasing said wiper blade from said rod-like extension.

According to a further preferred embodiment, said connecting device comprises a first part and a second part, wherein said rod-like extension of said oscillating arm can be pivotally connected to said first part about said pivot axis, with the interposition of said second part, wherein said second part comprises said channel, and wherein said first part is connected to said wiper blade and said second part is connected to said first part. Preferably, said first and said second parts are each made in one piece of plastic material. Said second part may be detachably connected to said first part.

Preferably, the protrusion, arranged to engage the first recess in the rod-like extension, is arranged at the first part and the second part comprises the resilient tongue arranged for engaging the second recess as mentioned above. Preferably, by moving the wiper device between the working and service position, the protrusion on the first part engages and disengages the first recess. As mentioned above, the first recess is preferably arranged at the upper lateral side, when a twisted rod-like extension is used as mentioned above.

According to a further preferred embodiment, said first part and said second part are provided with mutually cooperating pivot means for pivotally connecting said second part to said first part. Particularly, said second part is connected to said first part by pivotally engaging protuberances of said first part, at the location of said pivot axis, in recesses provided in said second part. More in particular, said second part is (detachably) connected to said first part through a snapping/clipping operation.

According to a further aspect, an oscillating arm is provided comprising a rod-like extension arranged to be pivotally connected to a connecting device of a windscreen wiper device, preferably a windscreen wiper device as described above, wherein the oscillating arm comprises a first recess and second recess provided on at least one longitudinal exterior side of said rod-like extension and wherein the rod-like extension has a substantially constant width along the distal end thereof. Preferably, said first and second recesses have an open circumference.

Preferably, at least along the length of the rod-like extension to be received in the channel of the connecting device, the width of the rod-like extension is substantially constant. To further improve the corrosion resistance, the rod-like extension may have a substantially constant width and/or cross-section along substantially the entire length.

According to a preferred embodiment, said recesses are arranged at opposite longitudinal exterior sides of the rod-like extension, as described above. Preferably, the recesses are arranged at opposite sides at the same location along the length of the rod-like extension.

According to a further preferred embodiment rod-like extension has a twisted orientation relative to the oscillating arm and preferably the hinge articulation.

According to a further aspect a vehicle is provided comprising a windscreen wiper device as described above and/or an oscillating arm as described above.

According to a further aspect, a method for manufacturing an oscillating arm is provided, in particular an oscillating arm as described above and/or for a windscreen wiper device as described above, wherein the method comprises the steps of:

providing an oscillating arm comprising a rod-like extension having a substantially constant width along at least the distal end thereof;

providing two recesses in at least one longitudinal exterior side of said rod-like extension.

Preferably, the step of providing the two recesses comprises providing said recesses at opposite longitudinal exterior sides of the rod-like extension.

An efficient manufacturing method is obtained if the recesses are provided at opposite sides at the same location along the length of the rod-like extension. Any tool used to provide the recesses then does not need to be moved along the length of the arm.

A particular efficient method is obtained if the step of providing the recesses comprises a cutting operation. In particular providing a cut at the same location along the length of the rod-like extension in opposite sides thereof requires few manufacturing steps. Preferably, providing the recesses comprises an extrusion cutting process. Both recesses can then be provided in a single step. Preferably, both recesses have the same configuration.

BRIEF DESCRIPTION OF THE DRAWINGS

The present invention is further illustrated by the following Figures, which show a preferred embodiment of the device according to the invention, and are not intended to limit the scope of the invention in any way, wherein.

DETAILED DESCRIPTION

Figure 1A:
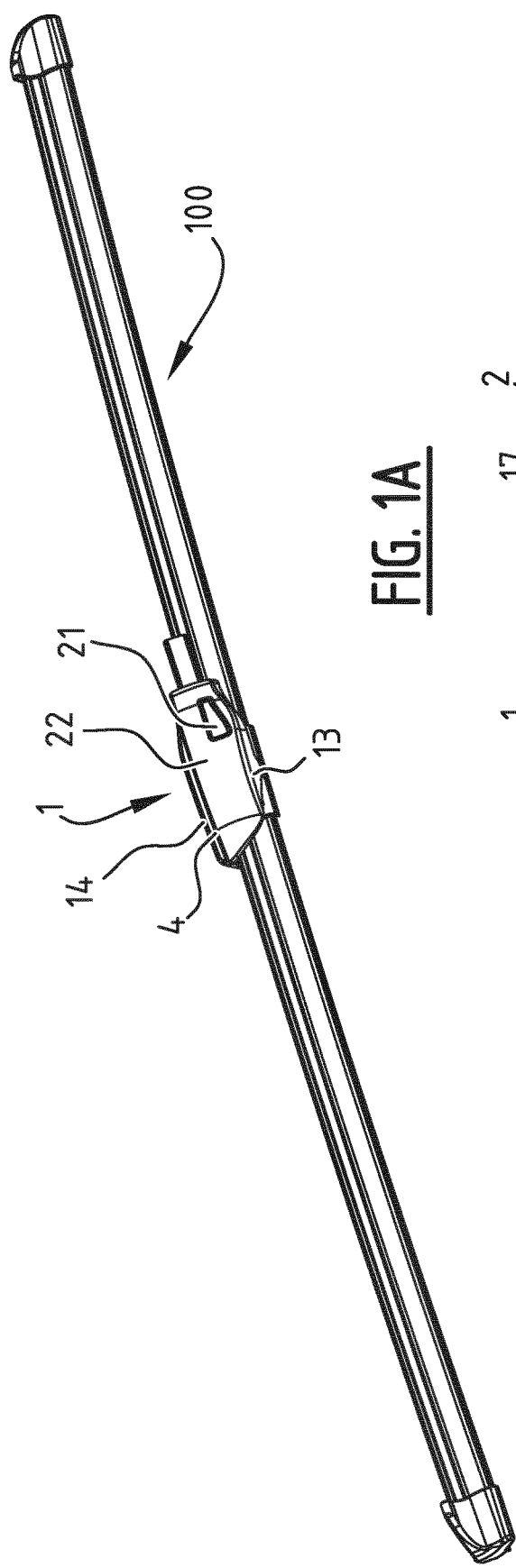
FIG. 1A shows a windscreen wiper device in assembled state.
Figure 1B:
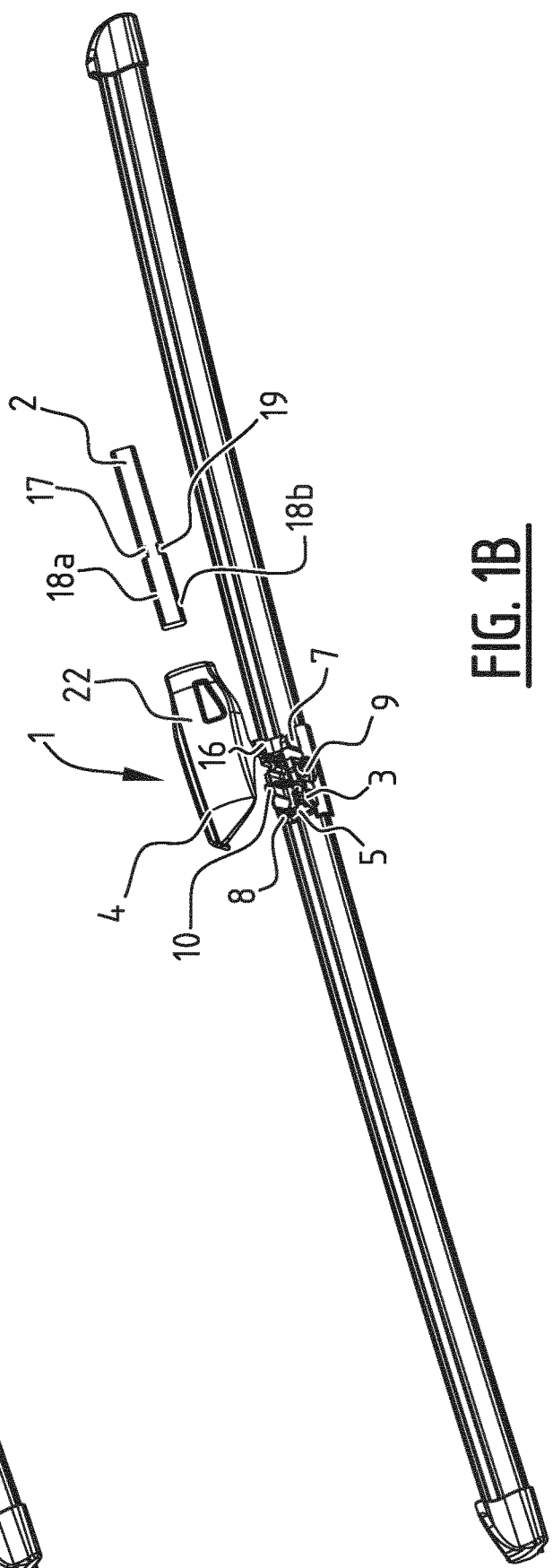
FIG. 1B shows a windscreen wiper device in disassembled state.
Figure 6:
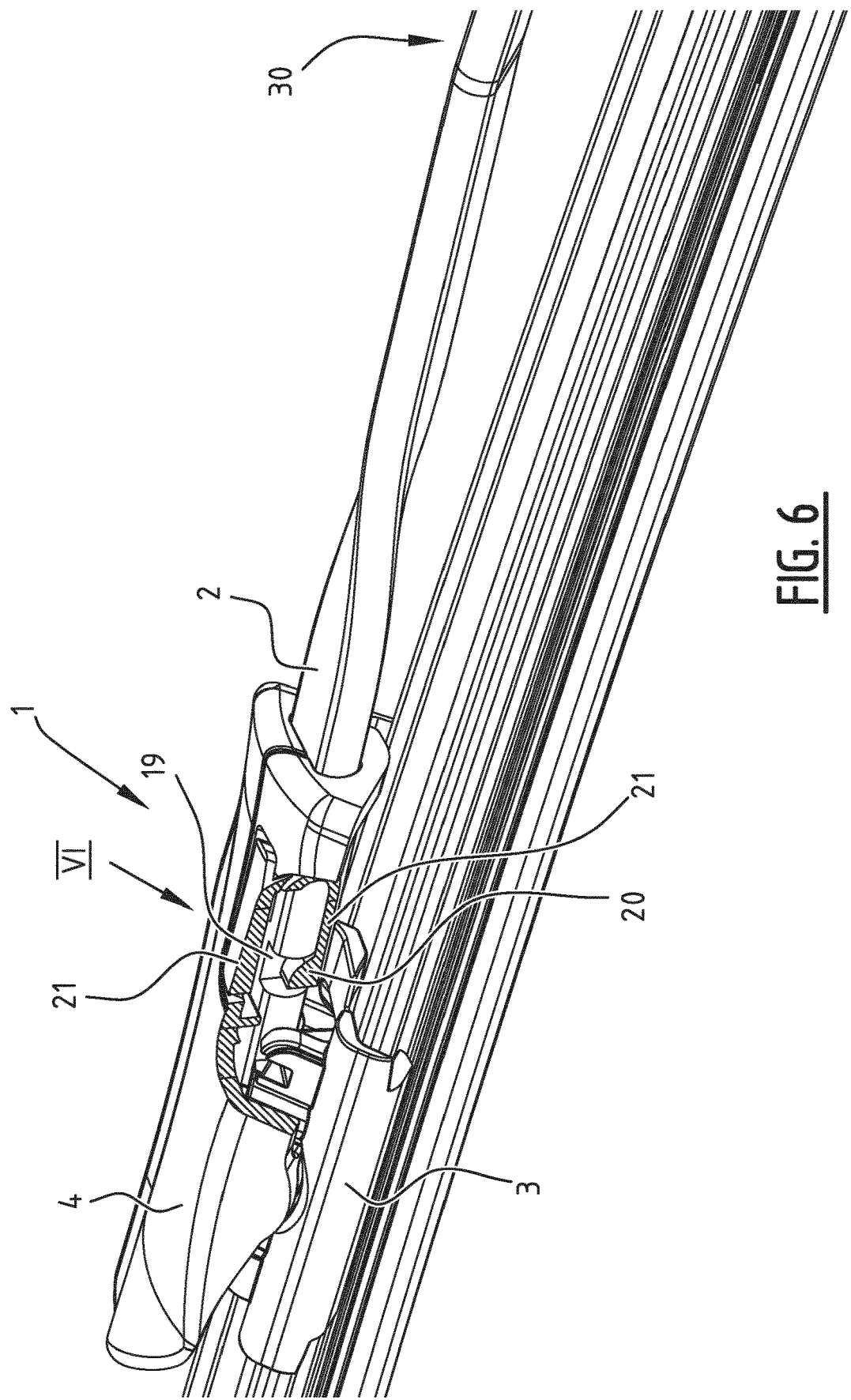
FIG. 6 shows the connecting device in partial cross-section.

FIGS. 1A and B refers a windscreen wiper device 100 of the flat blade type built up of a wiper blade, in the longitudinal sides of which opposing longitudinal groove are formed, and of longitudinal strips ("flexors") made of spring band steel, which are fitted in said longitudinal grooves. Said strips form a flexible carrier element for the rubber wiper blade, as it were, which is thus biased in a curved position (the curvature in operative position being that of a windscreen to be wiped). As shown in particular in FIG. 1B, the windscreen wiper device 100 is furthermore built up of a connecting device 1 of plastic material for a rod-like extension 2 of a windscreen wiper arm 30 (see also FIG. 6). Said connecting device 1 comprises a first part 3 and a second part 4 acting as a joint part, wherein said rod-like extension 2 arm can be pivotally connected to said first part 3 about said pivot axis, with the interposition of said second part 4. Said first part 3 comprises a flat base 5 (see also FIG. 3) having inwardly extending legs 6 integral therewith engaging around longitudinal sides of the wiper blade, at the location of said grooves, as a result of which the first part 1 is firmly attached to the unit consisting of the wiper blade and the strips. Said first part 3 comprises two opposite side walls 7,8 extending in upright direction from said flat base 5. On said opposite side walls 7,8 are formed cylindrical protuberances 9,10 extending outwardly. These protuberances 9,10 pivotally engage, at the location of said pivot axis, in identically shaped recesses 11,12 provided in opposite walls 13,14 (see also FIGS. 2A and 4) of the second part 4. Hence, said second part 4 is connected to said first part 3 through a snapping/clipping operation. Said side walls 7,8 of said first part 3 are entirely located inside said second part 4 in a working position of said wiper blade.

With reference to FIGS. 2A-C and 3, said second part 4 comprises a channel 15 arranged to receive (in a linear movement I) said rod-like extension 2 of said oscillating arm. As shown, said channel 15 has a length and a width, and wherein a plane extending in a direction of the width of said channel and a plane extending through said longitudinal strip along a width thereof at the location of the connecting device enclose an angle α=40°. Also the rod-like extension 2 extends under the same angle α and has a twisted orientation relative to the oscillating arm 30 (see again FIG. 6).

Figure 2A:
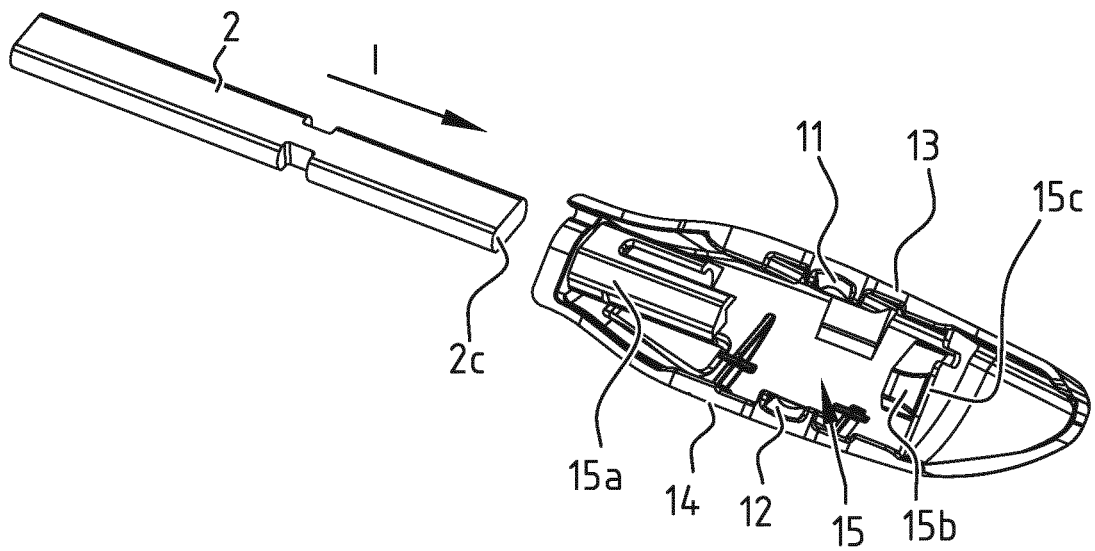
FIG. 2A shows the different steps of inserting a rod-like extension in the channel in a bottom view of the connecting device.
Figure 2B:
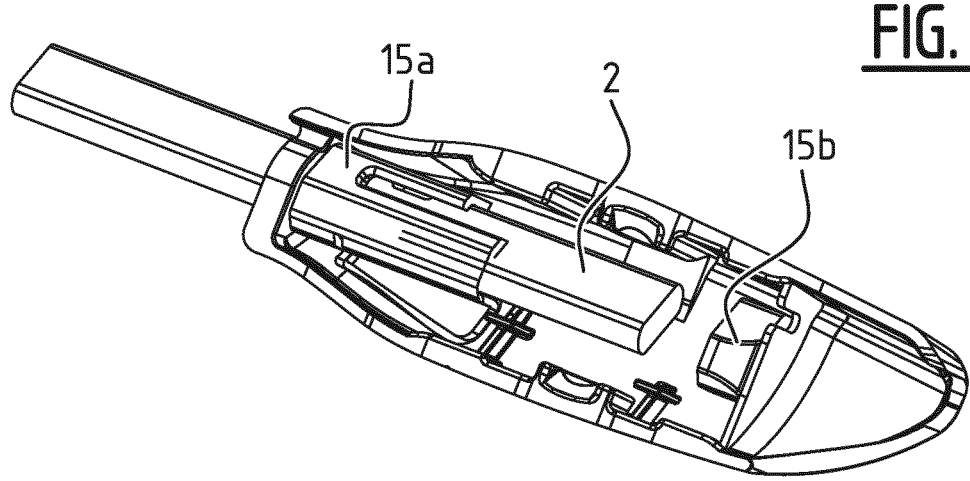
FIG. 2B shows the different steps of inserting a rod-like extension in the channel in a bottom view of the connecting device.
Figure 2C:
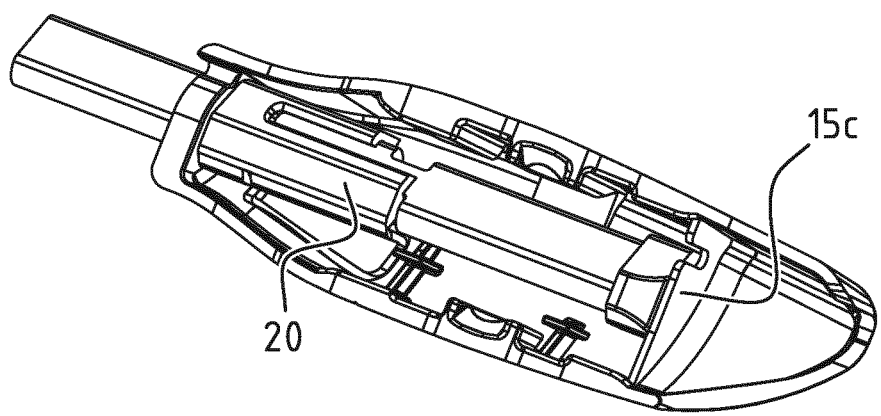
FIG. 2C shows the different steps of inserting a rod-like extension in the channel in a bottom view of the connecting device.

As best seen in FIGS. 2A-C, the channel 15 is subdivided in channel sections or chambers 15a and 15b. Chamber 15a is located at the entry side of the channel 15 and functions to guide the rod-like extension 2 within the second part 4 upon insertion. This is shown in FIG. 2B. At the opposite end of the channel 15, a second chamber 15b is provided which is arranged to receive the distal end of the rod-like extension 2. The channel 15 hereto has an end wall 15c which is arranged to receive the end surface 2c of the rod-like extension 2. When the extension 2 is fully inserted into the channel 15, as shown in FIG. 2C, the end surface 2c of the extension 2 abuts the end wall 15c. Further inwardly movement I is then not possible.

Figure 3:
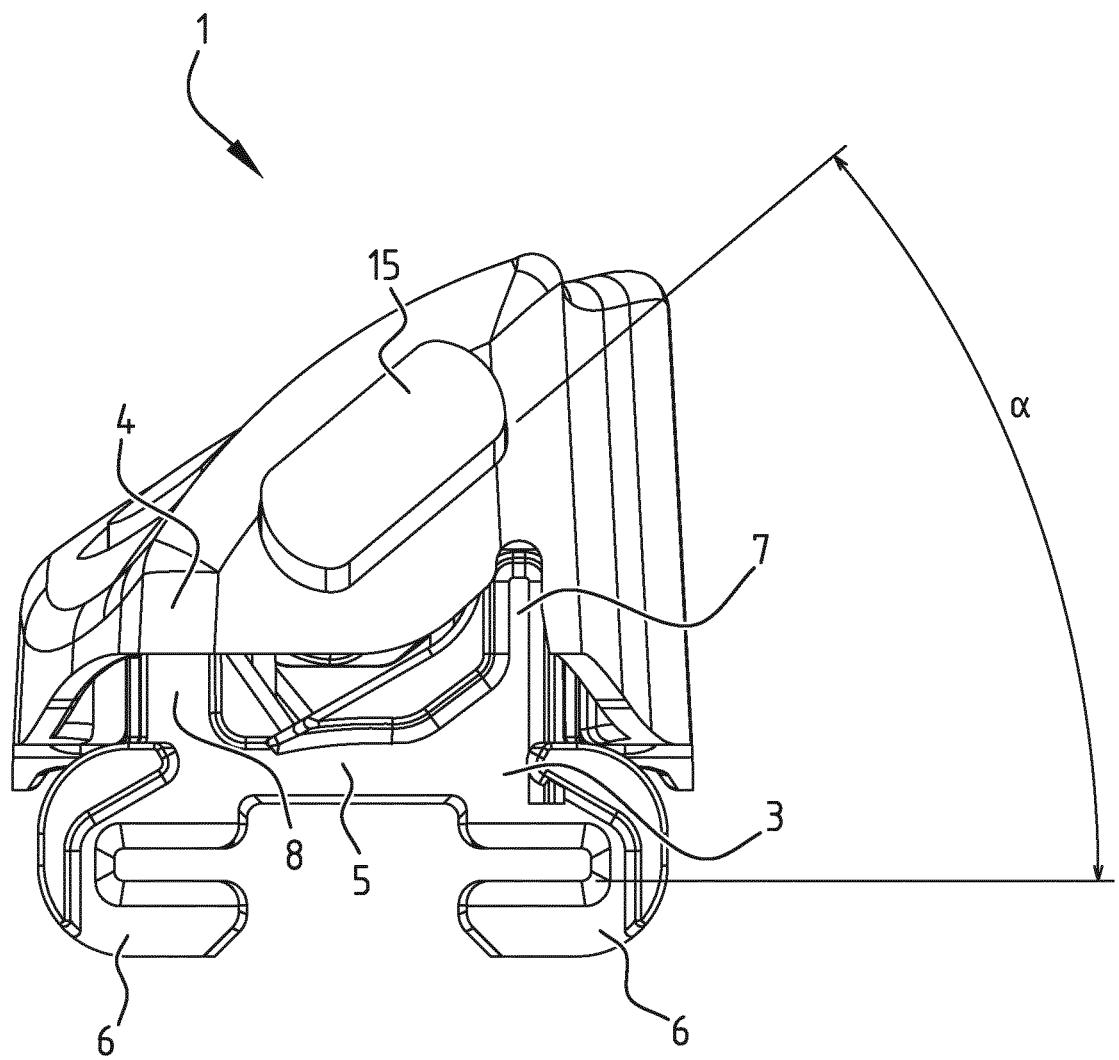
FIG. 3 shows a cross-sectional view of the channel.

The channel 15, at least at the entrance and at the opposite end of said entrance has the same width for receiving the rod-like extension 2. For the entrance side (chamber 15a), this is best visible in FIG. 4. The extension also has a substantially constant width along the distal end thereof. Upon receipt of the extension 2 in the channel 15, or the chambers 15a, b thereof, any movement along the direction of the width is prevented. As shown in FIG. 3, the cross-sectional shape of the channel 15 corresponds to the cross-sectional shape of the extension 2. The channel 15, at least the chambers 15a, b thereof, are thus shaped in accordance with the shape of the rod-like extension 2. Upon receipt, any movement other than movement along the longitudinal direction (indicated with I in FIG. 2A) is thus prevented.

One of said side walls 8 of said first part 3 comprises a protrusion 16 (see for instance FIG. 5A) arranged to engage into a first recess 17 having an open circumference and provided on a longitudinal exterior side 18a of said rod-like extension 19. As can be best seen in FIG. 5C, the protrusion 16 is located near the edge (seen in longitudinal direction) of the first part 3. This increases the distance between the pivot axis as defined by the protuberances 9,10 and the protrusion 16.

Figure 5A:
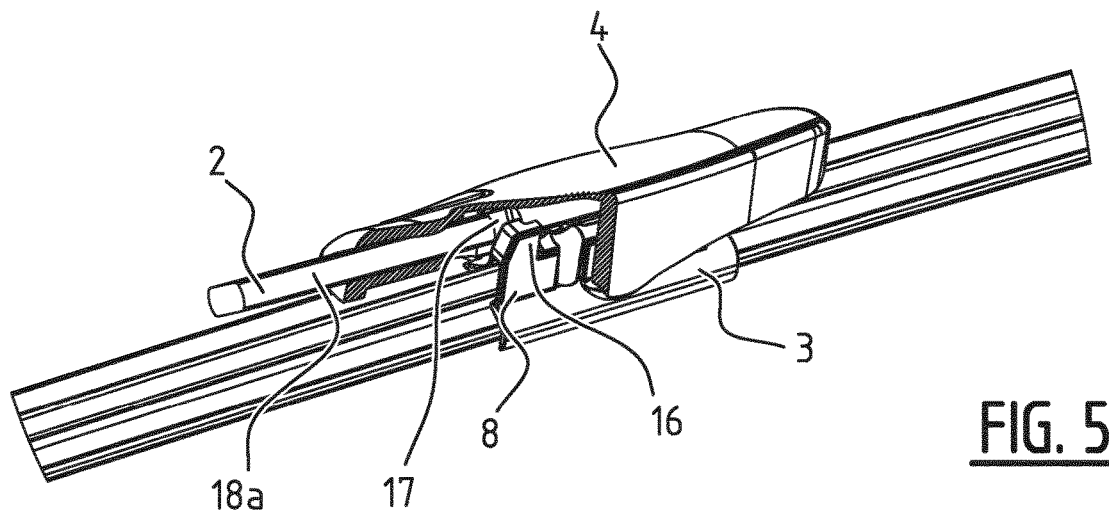
FIG. 5A shows moving the connecting device from the working position to the service position.
Figure 5B:
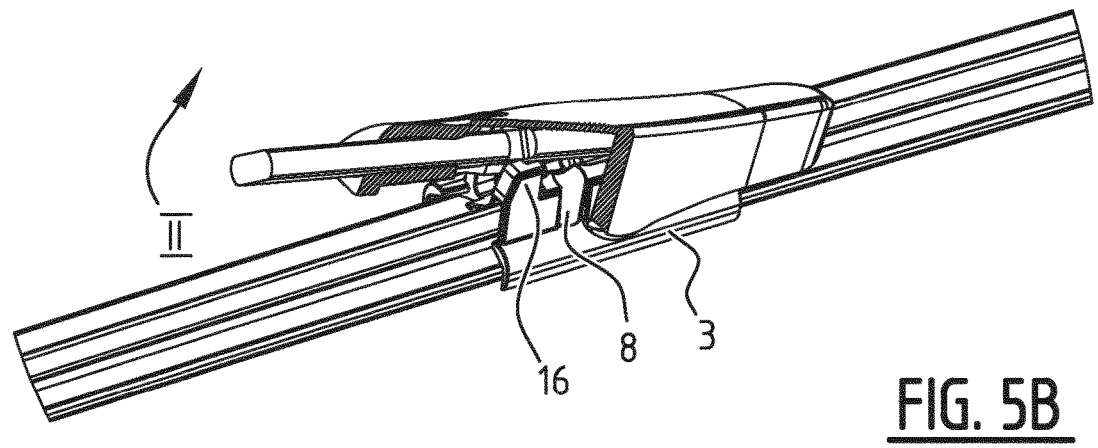
FIG. 5B shows moving the connecting device from the working position to the service position.
Figure 5C:
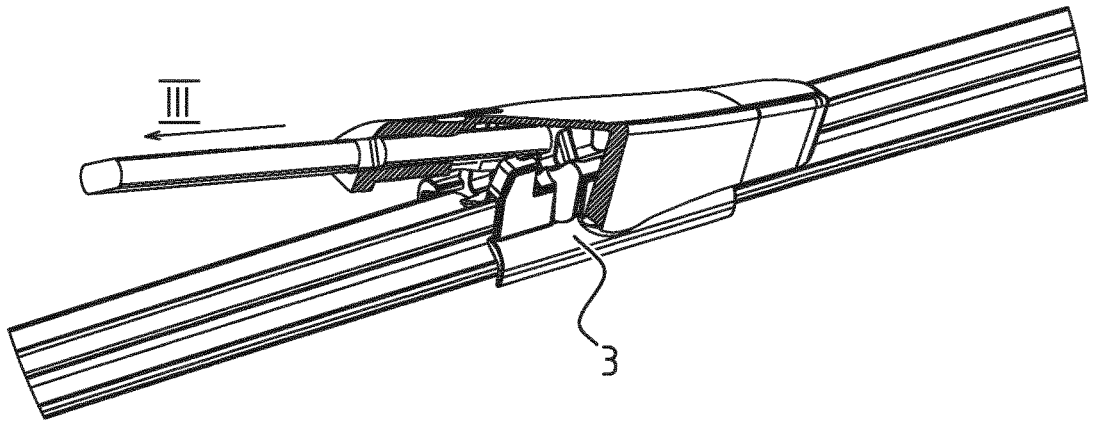
FIG. 5C shows moving the connecting device from the working position to the service position.

For mounting or dismounting the connecting device 1 from the rod-like extension the second part 4 (and thus the free end of the rod-like extension 2 connected thereto), is pivoted relative to the first part 3, wherein reference is made to FIGS. 5A-C. As far as dismounting is concerned, while carrying out the pivot movement (arrow II in FIG. 5B), the protrusion or cam 16 is no longer in line with the first recess 17, so that the second part 4 and the first part 3 attached thereto can be released (arrow III in FIG. 5C) from the rod-like extension 2 (see service position seen in FIGS. 5B and C). As far as mounting is concerned, while carrying out the pivot movement, the protrusion or cam 16 becomes in line with the first recess 17, so that the second part 4 and the first part 3 attached thereto is retained onto the rod-like extension 2 (working position seen in FIG. 5A). The mutually cooperating protrusion 16 and recess 17 act as second retention mechanism in case first retention mechanism, as explained below, would inadvertently fail.

Figure 4:
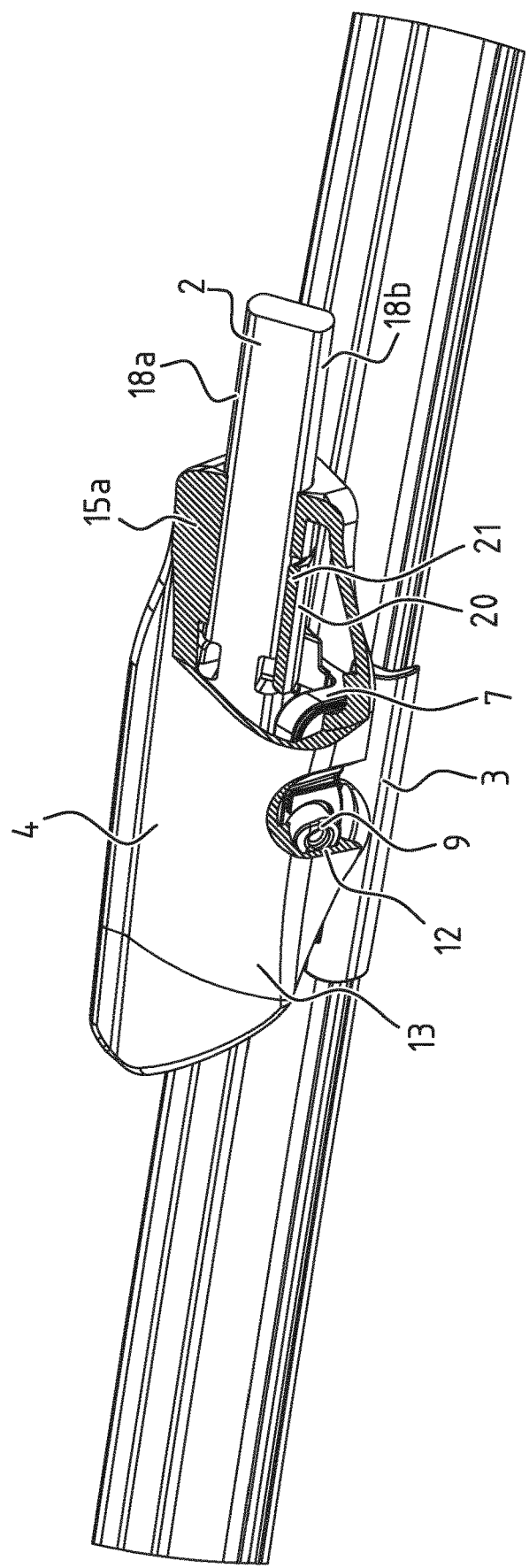
FIG. 4 shows the entrance of the channel in the connecting device.

The rod-like extension 2 is also provided with a second recess 19 also having an open circumference and provided on the opposite longitudinal exterior side 18b of said rod-like extension 2. As shown, said first and second recesses 17,19 have an open circumference and are located at the same longitudinal position on the extension 2 on opposite sides 18a,b thereof. Said second recess 19 cooperates with a resilient tongue 20 on the second part 4 arranged to engage into a second recess 19, together acting as first retention mechanism in this case. Said resilient tongue 20 is hingeable along a hinge axis between an inward position retaining said second part 4 (together with the first part 3 and the wiper blade attached thereon) onto said rod-like extension 2 (see FIG. 6 wherein the tongue 20 is shown to engage the recess 19) and an outward position releasing second part 4 (together with the first part 3 and the wiper blade attached thereon) from said rod-like extension 2. Said resilient tongue is hingeable (i.e. activated and deactivated) from said inward position into said outward position by a push button 21. Said push button 21 forms a part of an outer wall 22 of said second part 4 and is located near a free end of said second part 4 facing towards said rod-like extension 2. Pushing the button 21 downwardly (see arrow IV in FIG. 6) will thus result in moving the resilient tongue 20 from the recess 19, also in a downward direction in this example. As can be seen in FIG. 4, the resilient tongue 20 extends in the channel 15, specifically the chamber 15a and forms a wall 21 thereof. A part of the resilient tongue 20, for instance a protrusion thereof, is then arranged to engage the recess 19.

As mentioned above, the extension 2 has a twisted orientation relative to the oscillating arm 30 and thus has an upper lateral side 18a and a lower lateral side 18b. The first recess 17 is arranged at the upper later side 18a, while the second recess 19 is arranged at the lower lateral side 18b.

The recesses are provided at the same longitudinal location on the extension and are preferably formed by an extrusion cut operation. Both recesses can thus be formed in a single step, which provides an efficient manufacturing process.

The present invention is not limited to the embodiment shown, but extends also to other embodiments falling within the scope of the appended claims.

The invention claimed is:

1. A windscreen wiper device with an elongated wiper blade, the windscreen wiper device comprising:
an extension configured to connected to a wiper arm on a proximal end and having an end surface on a distal end, the extension having opposite first and second longitudinal exterior sides defining first and second recesses, respectively; and
a connecting device having:
a first part including: a base; inwardly extending legs depending from the base for coupling to the elongated wiper blade; opposing side walls upstanding from the base, each side wall including a protuberance extending outwardly; and a distal protrusion;
a second part including: an outer wall extending between opposing walls, wherein each of the opposing walls define opposing recesses to capture the protuberances such that the second part rotates relative to the first part; a guide member forming a channel together with the outer wall and the opposing walls for receiving the extension, wherein the guide member has a resilient tongue formed with a pushbutton; and an end wall coupled to a distal portion of the outer wall,
wherein:
to couple the extension to the second part, the extension is inserted into the channel until the end surface abuts the end wall and the resilient tongue hinges into the second recess in a normally activated position to prevent retraction and lock the extension to the second part as a primary retention mechanism, and
as a secondary retention mechanism in an operating position, once the first and second parts are snapped together so that the protuberances are in the opposing recesses, the second part is rotated on to the first part and, thereby the protrusion cams into the first recess; and
to place the connecting device in a service position so that the extension can be removed from the connecting device, the second part is rotated away from the first part so that the protrusion exits the first recess and the pushbutton is pressed to unhinge the resilient tongue into a deactivated position with the resilient tongue outside the second recess.

2. The windscreen wiper device of claim 1, wherein the resilient tongue has a distal end that gradually widens to form a ramp for banking against the extension to couple in the second recess and the protrusion has a distal nub to frictionally retain the second part when rotated on to the first part.

3. The windscreen wiper device of claim 1, wherein a cross-section of the extension and the channel have similar shapes.

4. A windscreen wiper device of the flat blade type comprising:
an elongated wiper blade;
a connecting device having:
a first part including a flat surface with inwardly extending legs configured to engage around longitudinal sides of the elongated wiper blade, the first part further including opposite side walls, each opposite side wall including a protuberance extending outwardly;
a second part forming a channel, the second part further defining recesses on opposite walls configured to pivotally engage the protuberances of the first part such that the second part is configured to pivot relative to the first part, the second part further including a resilient tongue and a protrusion; and
an extension of an oscillating arm configured for positioning in the channel, the extension of an oscillating arm having a first and second recess arranged at opposite longitudinal exterior sides of the extension of an oscillating arm, wherein:

in a working position, when the second part is pivotally in line with the first part, the protrusion of the connecting device is configured to engage the first recess of the extension of an oscillating arm, and the resilient tongue hinges into the second recess, restraining the extension of an oscillating arm, and in a service position, when the second part pivots away from the elongated carrier element, the protrusion of the connecting device is configured to disengage the first recess of the extension of an oscillating arm, and the resilient tongue is configured to hinge out of the second recess upon user actuation, freeing the extension of an oscillating arm.

5. The windscreen wiper device of claim 4, wherein the resilient tongue is configured to hinge into the second recess by actuation of a push button, the push button forming a part of an outer wall of the second part.

6. The windscreen wiper device of claim 4, wherein the resilient tongue forms a floor of the second part, and the extension of an oscillating arm has a lower longitudinal exterior side such that the resilient tongue engages the second recess in the lower longitudinal exterior side.

7. A windscreen wiper device of the flat blade type comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an extension of an oscillating arm, wherein:

the connecting device has:

a first part including a flat base with inwardly extending legs configured to engage around longitudinal sides of the elongated wiper blade, the first part further including opposite side walls, each opposite side wall including a protuberance extending outwardly, and a second part defining recesses on opposite walls configured to pivotally engage the protuberances of the flat base such that the first part is configured to pivot relative to the second part, the second part comprises a channel arranged to receive the extension of an oscillating arm, a protrusion, and a resilient tongue, the extension of an oscillating arm comprises a first recess and a second recess arranged at opposite longitudinal exterior sides, the first recess and second recess of the extension of an oscillating arm are configured to engage with the protrusion of the second part and the resilient tongue respectively when inserted into the connecting device and when the first and second parts are pivotally in line, and the first recess and second recess of the extension of an oscillating arm are configured to disengage from the protrusion when the second part pivots away from the first part, and release from the resilient tongue upon user actuation.

8. The windscreen wiper device according to claim 7, wherein the channel has a substantially constant width from the entrance to the opposite end.

9. The windscreen wiper device according to claim 7, wherein the channel has a closed circumference and wherein the channel has a closed end for receiving a distal surface of the extension of an oscillating arm.

10. The windscreen wiper device according to claim 7, wherein the channel comprises a first chamber proximal to an entrance of the channel and a second chamber distally from the first chamber near an opposite end of the channel, wherein the chambers have a same width.

11. The windscreen wiper device according to claim 7, wherein the first and second recesses have an open circumference.

12. The windscreen wiper device according to claim 7, wherein the recesses are located near a distal end of the extension of an oscillating arm that is inserted into the connecting device.

13. The windscreen wiper device according to claim 12, wherein the recesses are arranged at opposite sides at a same location along a length of the extension of an oscillating arm.

14. The windscreen wiper device according to claim 12, wherein the extension of an oscillating arm has an upper longitudinal exterior side and a lower longitudinal exterior side, wherein the protrusion is arranged to engage the recess in the upper longitudinal exterior side and wherein the resilient tongue is arranged to engage the recess in the lower longitudinal exterior side.

15. The windscreen wiper device according to claim 7, wherein the channel has a length and a width, and wherein a plane extending in a direction of the width of the channel and a plane extending through the longitudinal strip along a width thereof at a location of the connecting device enclose an angle $\alpha$, wherein $15°<\alpha<60°$.

16. The windscreen wiper device according to claim 7, wherein said resilient tongue is hingeable along a hinge axis between an inward position retaining said wiper blade onto said extension of an oscillating arm and an outward position releasing said wiper blade from said extension of an oscillating arm.

17. The windscreen wiper device according to claim 16, wherein the resilient tongue is hingeable from the inward position into the outward position by a push button, wherein the push button forms a part of an outer wall of the connecting device.

18. The windscreen wiper device according to claim 16, wherein the hinge axis extends substantially perpendicular to a longitudinal axis of the extension of an oscillating arm.

* * * * *